US010972471B2

(12) United States Patent
Connell, II et al.

(10) Patent No.: US 10,972,471 B2
(45) Date of Patent: Apr. 6, 2021

(54) DEVICE AUTHENTICATION USING SYNCHRONIZED ACTIVITY SIGNATURE COMPARISON

(71) Applicant: International Business Machines Corporation, Armonk, NY (US)

(72) Inventors: Jonathan H. Connell, II, Cortlandt-Manor, NY (US); Jae-Eun Park, Fishkill, NY (US); Nalini K. Ratha, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 405 days.

(21) Appl. No.: 15/843,625

(22) Filed: Dec. 15, 2017

(65) Prior Publication Data
US 2019/0190920 A1 Jun. 20, 2019

(51) Int. Cl.
H04W 12/06 (2009.01)
H04L 29/06 (2006.01)
H04W 12/00 (2021.01)

(52) U.S. Cl.
CPC .......... H04L 63/102 (2013.01); H04L 63/083 (2013.01); H04L 63/0876 (2013.01); H04W 12/00508 (2019.01); H04W 12/00512 (2019.01); H04W 12/0605 (2019.01)

(58) Field of Classification Search
CPC .................... H04W 12/0605; H04W 12/00512
See application file for complete search history.

(56) References Cited

U.S. PATENT DOCUMENTS

| 5,757,916 A * | 5/1998 | MacDoran ............ G01S 19/215 380/258 |
| 6,108,583 A * | 8/2000 | Schneck ............... H04L 63/105 700/67 |
| 7,606,560 B2 * | 10/2009 | Labrou ................. H04L 63/083 455/411 |
| 7,609,863 B2 | 10/2009 | Black |
| 7,861,077 B1 | 12/2010 | Gallagher, III |
| 8,646,060 B1 * | 2/2014 | Ben Ayed ........... H04L 63/0853 726/9 |
| 9,392,451 B2 | 7/2016 | Karabinis |
| 2002/0138762 A1 * | 9/2002 | Horne ................ H04L 63/0227 726/25 |

(Continued)

OTHER PUBLICATIONS

Unknown; "MAC spoofing"; Wikipedia; Printed Dec. 11, 2017; pp. 4; <https://en.wikipedia.org/wiki/MAC-spoofing>.

Primary Examiner — Ponnoreay Pich
(74) Attorney, Agent, or Firm — Samuel A. Waldbaum

(57) ABSTRACT

A system, method and program product for authenticating a device. An authentication service is provided having: a data management system for periodically collecting and storing signature data from each of a set of registered devices, wherein the signature data includes a plurality of data points, and wherein at least one of the data points includes a device usage characteristic; a system for obtaining a temporal signature state (TSS) vector of a device in response to a transaction request from the device, wherein the TSS vector includes values for a selected subset of the data points forming the signature data; and an authenticator for comparing the TSS vector of the device with stored signature data in order to authenticate the device.

20 Claims, 4 Drawing Sheets

(56) References Cited

U.S. PATENT DOCUMENTS

| | | | |
|---|---|---|---|
| 2004/0098610 A1* | 5/2004 | Hrastar | H04L 63/1433 726/1 |
| 2007/0174082 A1* | 7/2007 | Singh | G06Q 20/20 705/44 |
| 2013/0102283 A1* | 4/2013 | Lau | H04W 12/06 455/411 |
| 2013/0232542 A1* | 9/2013 | Cheng | H04L 63/04 726/1 |
| 2015/0039513 A1 | 2/2015 | Adjaoute | |
| 2017/0109509 A1 | 4/2017 | Baghdasaryan | |
| 2017/0359306 A1* | 12/2017 | Thomas | H04L 63/10 |

* cited by examiner

DEVICE AUTHENTICATION USING SYNCHRONIZED ACTIVITY SIGNATURE COMPARISON

TECHNICAL FIELD

The subject matter of this invention relates to device authentication and more particularly to a system and method of authenticating user devices by analyzing activity signatures.

BACKGROUND

Authorizing user access to services (e.g., banking, work servers, email, etc.) remains an ongoing challenge for both the user and the service. Users have to remember and carry numerous tokens (e.g., usernames, passwords, etc.) for authentication to innumerable services needed in daily life. The tokens can be easily lost or stolen or copied and can be used without awareness of the user. Additionally, tokens such as passwords can be forgotten or compromised.

One authentication technique involves requiring the user to possess a unique physical token. Most smart devices, such as cell phones, tablets, laptops, desktop computers, etc., satisfy this feature. For instance, most such devices have unique MAC (media access control) addresses utilized by the network adapter. Accordingly, when a user wants to conduct a transaction, the service can compare the MAC address of user with a registered MAC address to verify the user. If the MAC address of the device does not match the registered MAC address of the user, the transaction can be terminated. Unfortunately, it is relatively easy to intercept network packets and relabel them, thus spoofing MAC addresses. In this way a hacker can initiate a fraudulent transaction from what looks to be properly registered device. Accordingly, while the concept of device authentication provides some promise for authenticating users engaging with services, it remains a relatively insecure approach.

SUMMARY

Aspects of the disclosure provide a solution for authenticating a device by tracking historical activity based signature data associated with the device, and then using the signature as a reference when authentication is required.

A first aspect discloses an authentication service, including: a data management system for periodically collecting and storing signature data from each of a set of registered devices, wherein the signature data includes a plurality of data points, and wherein at least one of the data points includes a device usage characteristic; a system for obtaining a temporal signature state (TSS) vector of a device in response to a transaction request from the device, wherein the TSS vector includes current values for a selected subset of the data points forming the signature data; and an authenticator for comparing the TSS vector of the device with stored signature data in order to authenticate the device.

A second aspect discloses a computer program product stored on a computer readable storage medium, which when executed by a computing system, provides an authentication service, the program product comprising: program code that periodically collects and stores signature data from each of a set of registered devices, wherein the signature data includes a plurality of data points, and wherein at least one of the data points includes a device usage characteristic; program code for obtaining a temporal signature state (TSS) vector of a device in response to a transaction request from the device, wherein the TSS vector includes current values for a selected subset of the data points forming the signature data; and program code for comparing the TSS vector of the device with stored signature data in order to authenticate the device.

A third aspect discloses a computerized method for providing an authentication service, including: periodically collecting and storing signature data from each of a set of registered devices, wherein the signature data includes a plurality of data points, and wherein at least one of the data points includes a device usage characteristic; obtaining a temporal signature state (TSS) vector of a device in response to a transaction request from the device, wherein the TSS vector includes current values for a selected subset of the data points forming the signature data; and comparing the TSS vector of the device with stored signature data in order to authenticate the device.

BRIEF DESCRIPTION OF THE DRAWINGS

These and other features of this invention will be more readily understood from the following detailed description of the various aspects of the invention taken in conjunction with the accompanying drawings in which.

Figure 1:
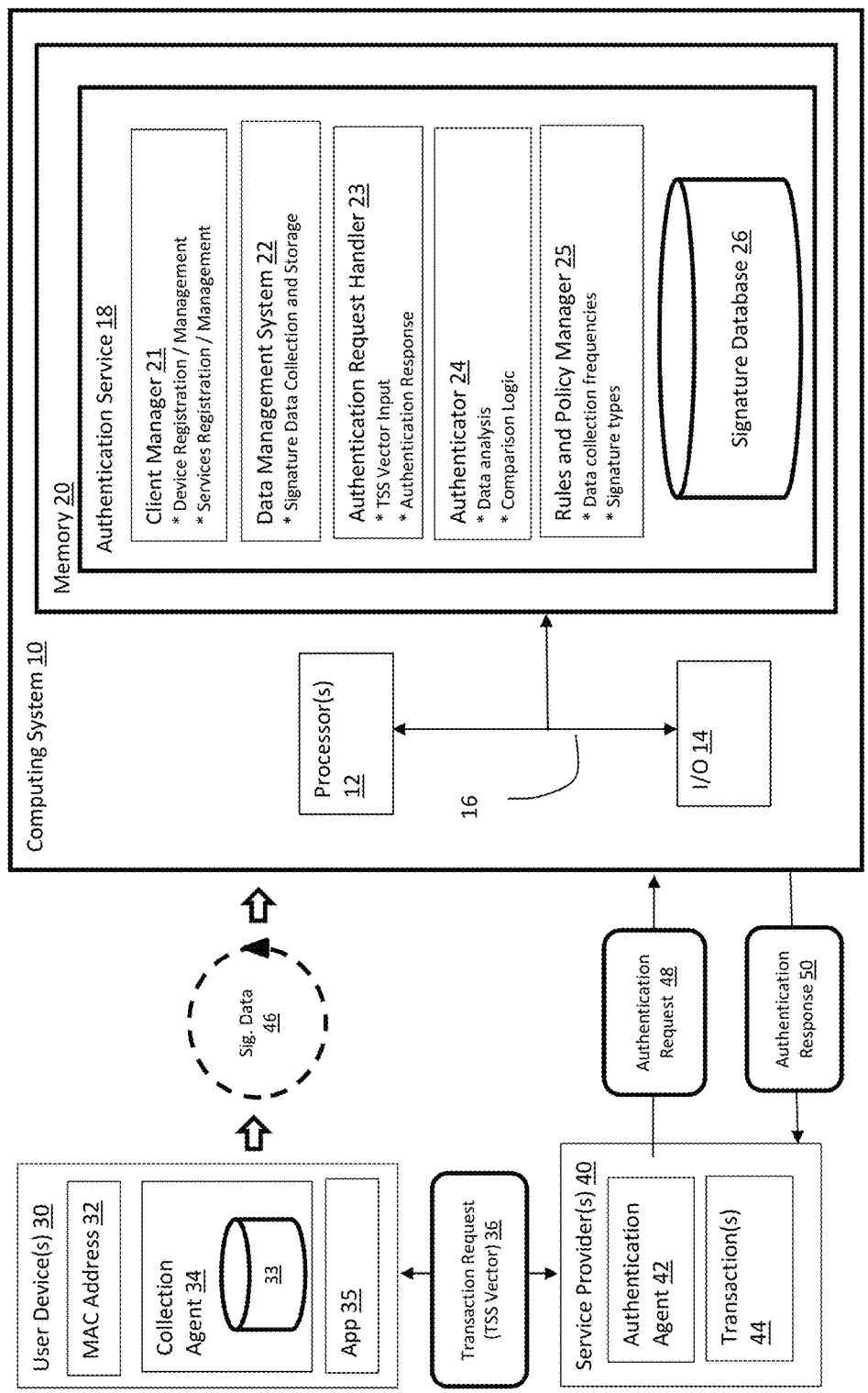
FIG. 1 shows an overview of an authentication service according to embodiments.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Referring now to the drawings, FIG. 1 depicts a computing system 10 having an authentication service 18 that is adapted to authenticate a user device 30 requesting a transaction with a service provider 40. In this illustrative example, the authentication service 18 is implemented as a stand-alone system capable of servicing any number of service providers 40. However, it is understood that authentication service 18 could be integrated into a single service provider 40.

In the illustrative embodiment shown, authentication service 18 may be implemented as a server, while user devices 30 and service providers 40 may be implemented as clients of the server. Client manager 21 accordingly handles the registration, communication, data management, security, etc., with user devices 30 and service providers 40. Additionally, it is noted that while this illustrative embodiment is directed at user based devices (e.g., smart phones, laptops, etc.), it is understood that the authentication service 18 may also be utilized to authenticate non-user based devices (e.g., Internet of Things (IoT) devices, autonomous vehicles, drones, etc.).

The authentication service 18 generally operates by periodically collecting signature data 46 from each registered user device 30. In one illustrative embodiment, a collection agent 34 is installed on the user device 30 to automatically collect and store signature data 46 in a local database 33. The signature data 46 is then uploaded to the authentication service 18 and stored in the signature database 26 utilizing data management system 22. Upload frequency may be determined in any manner, and can for example be dictated by rules and policy manager 16. For example, signature data 46 may be on-demand as needed, collected daily, whenever a user device 30 turns on, whenever a significant signature change is detected, or based on any other criteria or heuristic.

Signature data 46 generally comprises state information of patterns gleaned from the user device 30 and/or associated user, which is continuously changes (as opposed to signing one's name). For example, behavioral signatures may be collected that provide device usage characteristics, such as number of contacts on a phone, number of unread emails, number of active text conversations, recently played songs, recently used apps, number of photos/videos on the device, number of games played, screen saver used, etc. Operational signatures may be collected that reflect a functional status of the device 30, such as battery level, ambient sound levels, cellular or wifi signal strength, location data, etc. Physiological signatures may be collected that reflects a current user state such as heartrate, temperature, blood oxygen, GSR, EKG, breathing rates, etc. Any number and type of data points may be collected.

As is evident, signature data 46 is dynamic in nature, potentially changing from hour to hour or even moment to moment. In one embodiment, signature data 46 may be timestamped as it is collected and stored in the local database 33 and/or the signature database 26. Signature data 46 for a given device may therefore be stored temporally in the signature database, which can be analyzed for use in later authenticating the device 30. The following is an example of signature data 46 collected for a given device in which 100 data points are collected over time periods T:

| Device | Data Points | T1 | T2 | T3 | T4 | T5 | ... |
|---|---|---|---|---|---|---|---|
| Dp1 | (text conversations) | 2 | 4 | 6 | 3 | 5 | ... |
| Dp2 | (background color) | Blue | Red | Red | Red | Green | |
| Dp3 | (user body temp) | 98.3 | 98.6 | 98.2 | 98.4 | 99.0 | |
| Dp4 | (photos) | 103 | 95 | 110 | 115 | 122 | |
| ... | ... | | | | | | |
| Dp100 | (unread emails) | 4 | 5 | 4 | 7 | 6 | |

Once a corpus of signature data is collected for a device 30, the authentication service 18 may be employed to authenticate the device 30. Authentication of the user device 30 may for example occur from time to time when, e.g., an App 35 running on the user device 30 seeks to engage in a secure transaction 44 with the service provider 40. In this illustrative embodiment of FIG. 1, the transaction 44 is initiated with a transaction request 36 (e.g., a login, a request for data, etc.), which triggers an authentication agent 42 to be launched by the service provider 40. In this case, the authentication agent 42 may initially request traditional "hard" authentication information such as a MAC address 32, passwords, etc. Assuming the correct information is provided by the user device 30, authentication service 18 can then be employed to provide signature-based authentication of the device 30.

Signature-based authentication begins with the collection of a temporal signature state (TSS) vector from the user device 30. The TSS vector comprises a subset of data points of the signature data 46 that represent a current (or past) state of the device and/or user. For example, out of the 100 possible data points in the example above, the authentication process may request five data points as follow:

```
<TSS Vector>
    <Request ID> = 1234
        <Data/Time> = xx.xx.xxxx
            <Dp8 (number of photos on the device)> = 125
            <Dp13 (number of unread emails)> = 12
            < Dp43 (geographic location)> = latitude/longitude
            < Dp66 (heart rate)> = 76
            < Dp91 (battery level)> = 66%
<End>
```

The number and type of data points collected to form the TSS vector may be determined in any fashion and may vary for each transaction request 36. Determining what data points to include may be determined, e.g., by the authentication service 18, by the service provider, randomly, via a heuristic, etc. Note that in the above examples, each of the device data points is collected at the same time points. However, it is understood that different data points could be collected at different times. Also note that the authentication system 18 could for example request state data from the past, e.g., stored in local database 33.

Regardless, once the TSS vector is collected by the authentication agent 42, the vector is packaged with an authentication request 48 and forwarded to an authentication request handler 23 within the authentication service 18. Once inputted, the TSS vector is parsed and then processed by an authenticator 24 which compares the vector with associated signature data 46 previously stored in the signature database 26.

The analysis may be handled in any manner. For example, signature data for a given data point may be averaged and compared against the associated TSS vector value. Is other case, signature data for a given data point may provide a range to determine if the associated TSS vector value falls therein. In still other cases, signature data for a given data point be analyzed as a time based function (e.g., having a slope) to predict an expected value of an associated TSS vector value. Thus for example, if the number of active text conversations from a given user device 30 ranged from two to five, a low score could assessed if the associated TSS vector value was 20. Likewise, if the number of photos stored on the device 30 increased on average by five per week based on the stored signature data, a failing score could be assessed if the associated TSS vector value reported a doubling in the number of photos.

Because of the dynamic nature of the signature data, the comparison may require a non-deterministic approach. For example, authenticator 24 may utilize statistical analysis, fuzzy logic, artificial intelligence, weighted values, etc., to determine if there is a match. In one illustrative approach, authenticator 24 may statistically analyze each of data points in the TSS vector against the stored values, provide a score for each, and sum or average the results to generate a composite confidence score or level. For instance, authenticator 24 may determine that there is a 95% confidence level that the user device 30 is authentic. Depending on a security threshold of the service provider 40, the calculated confidence score may or may not be high enough to authenticate the user device 30. In the event the calculated confidence score is too low, the transaction may be denied or a different TSS vector may be requested and processed. Regardless of the implementation, an authentication response 50 (e.g., a calculated value, a yes/no, etc.) is provided back to the service provider 40.

Figure 2:
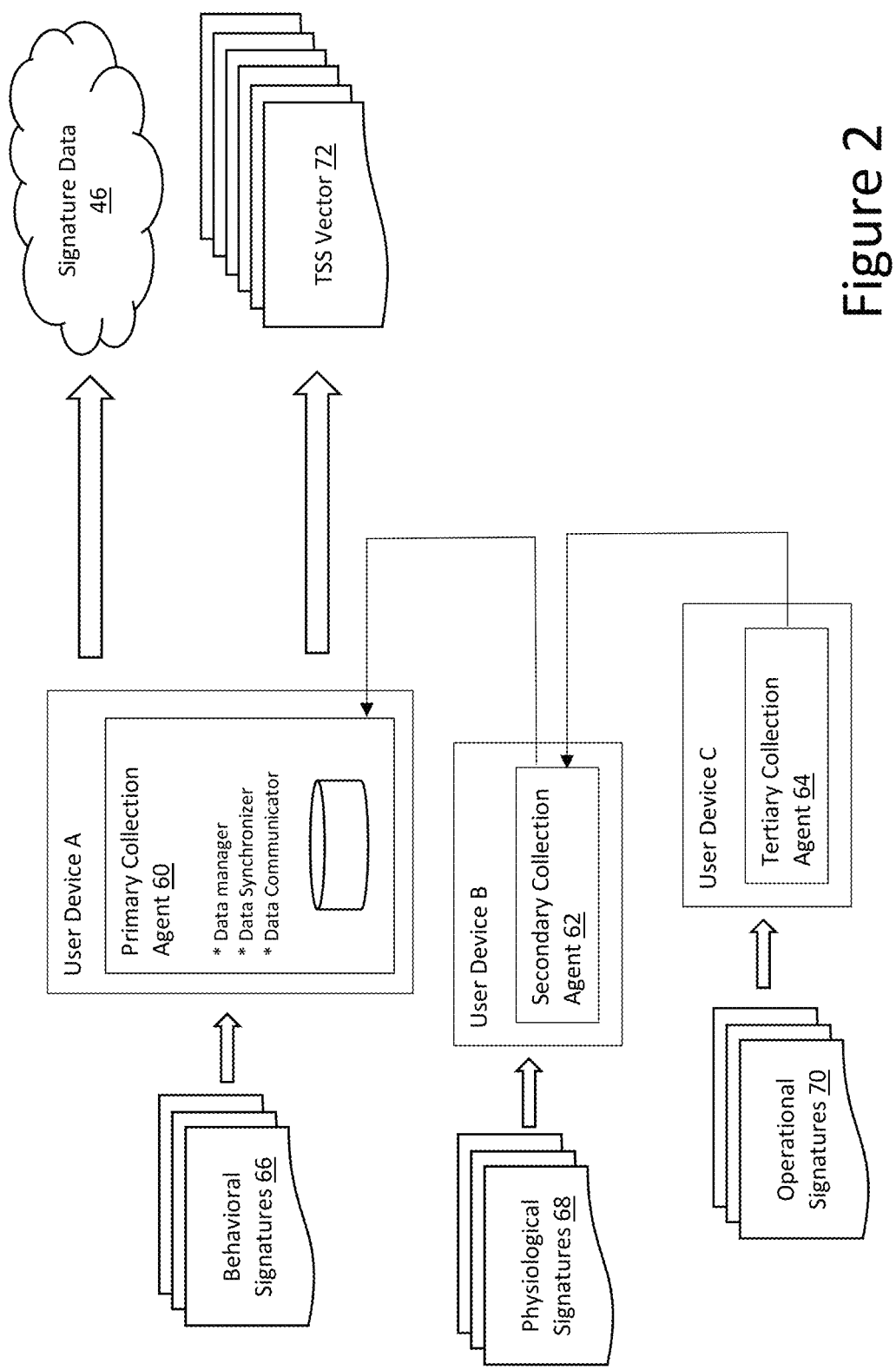
FIG. 2 shows a set of devices capable of interfacing the authentication service according to embodiments.

FIG. 2 depicts the use of coordinated user devices (A,B,C) for generating signature data 46 and the TSS vector 72 as described above. For example, a given user may regularly utilize a set of connected devices including user device A (e.g., a smart phone), user device B (e.g., a smart watch) and user device C (e.g., an IoT vehicle). In this example, user device A includes a primary collection agent 60 that manages, collects, synchronizes and communicates signature data with the other devices and authentication service 18 (not shown). In addition, primary collection agent 60 collects behavioral signatures from user device A. A secondary collection agent 62 installed on user device B may be adapted with sensors to collect physiological signatures 68 from the user and a tertiary collection device 64 installed on user device C to collect operational signatures 70. By collecting information from multiple user devices as shown, a higher level of confidence may be obtained when authenticating user device A. Note that while this example depicts each user device (A,B,C) providing a distinct type of information, it is recognized that a single device could generate different types of data (i.e., data from the behavioral, operational, and physiological groups).

Figure 3:
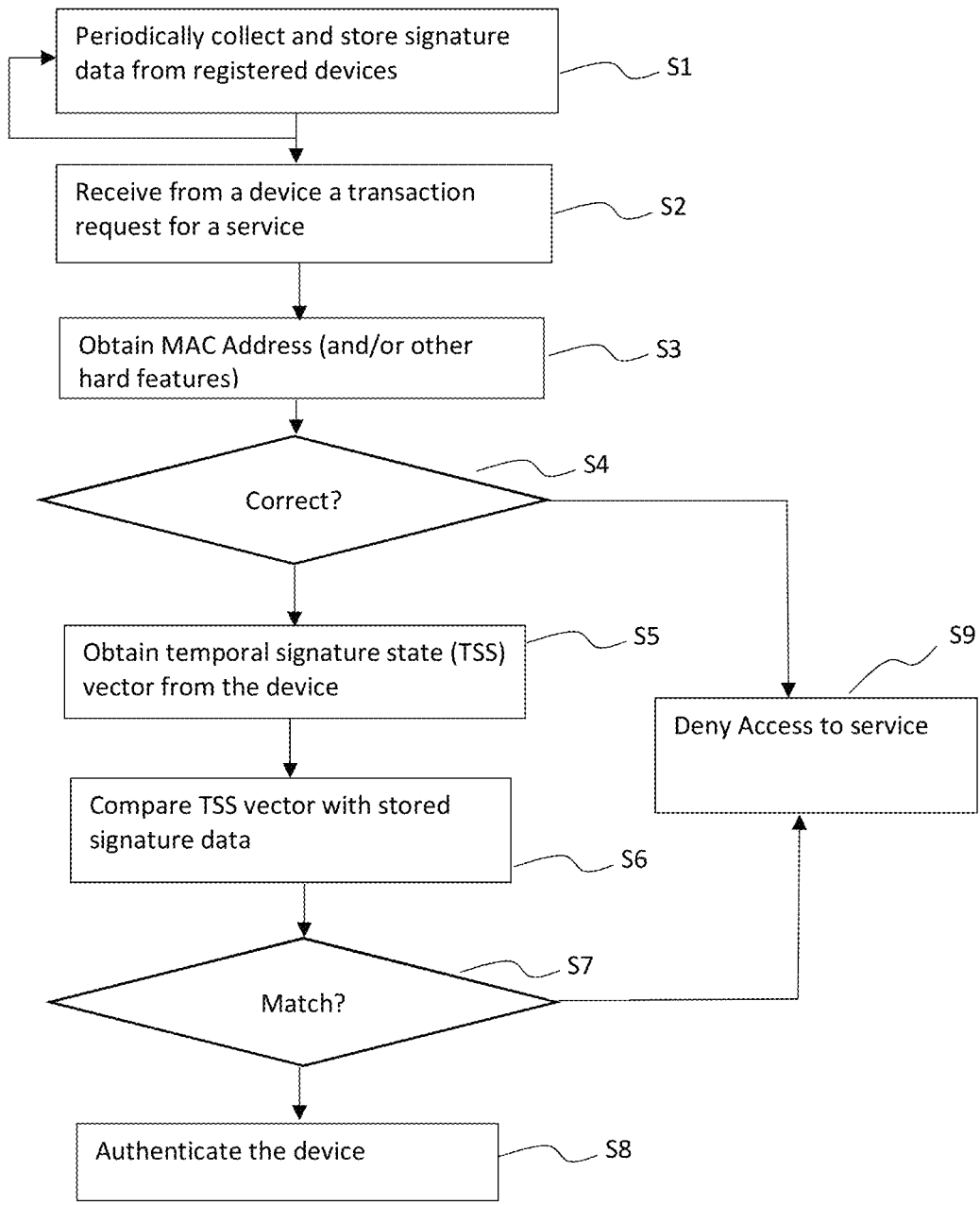
FIG. 3 shows a flow diagram of an authentication process according to embodiments.

FIG. 3 depicts a flow diagram showing a two-step authentication process utilizing the authentication service 18 (FIG. 1). At S1, signature data 46 is periodically collected and stored from all registered devices. At S2, a transaction request 36 is received at a service provider 40 for a service, and at S3 a MAC address is obtained from the requesting device. At S4, a check is made to determine if the MAC address matches what is registered with the service provider. (Note that other "hard features" in addition to the MAC address, such as username/password, etc., could be checked at this step as well.) If the MAC address is correct at S4, a TSS vector is obtained from the device. If the MAC address is not correct, access is denied at S9. At S6, the obtained TSS vector is compared with stored signature data and at S7 a "match" determination is made. If the TSS vector matches the stored signature data with a high enough confidence level, the device is authenticated at S8. If the TSS vector does not match with a high enough confidence level at S7, access is denied.

Figure 4:
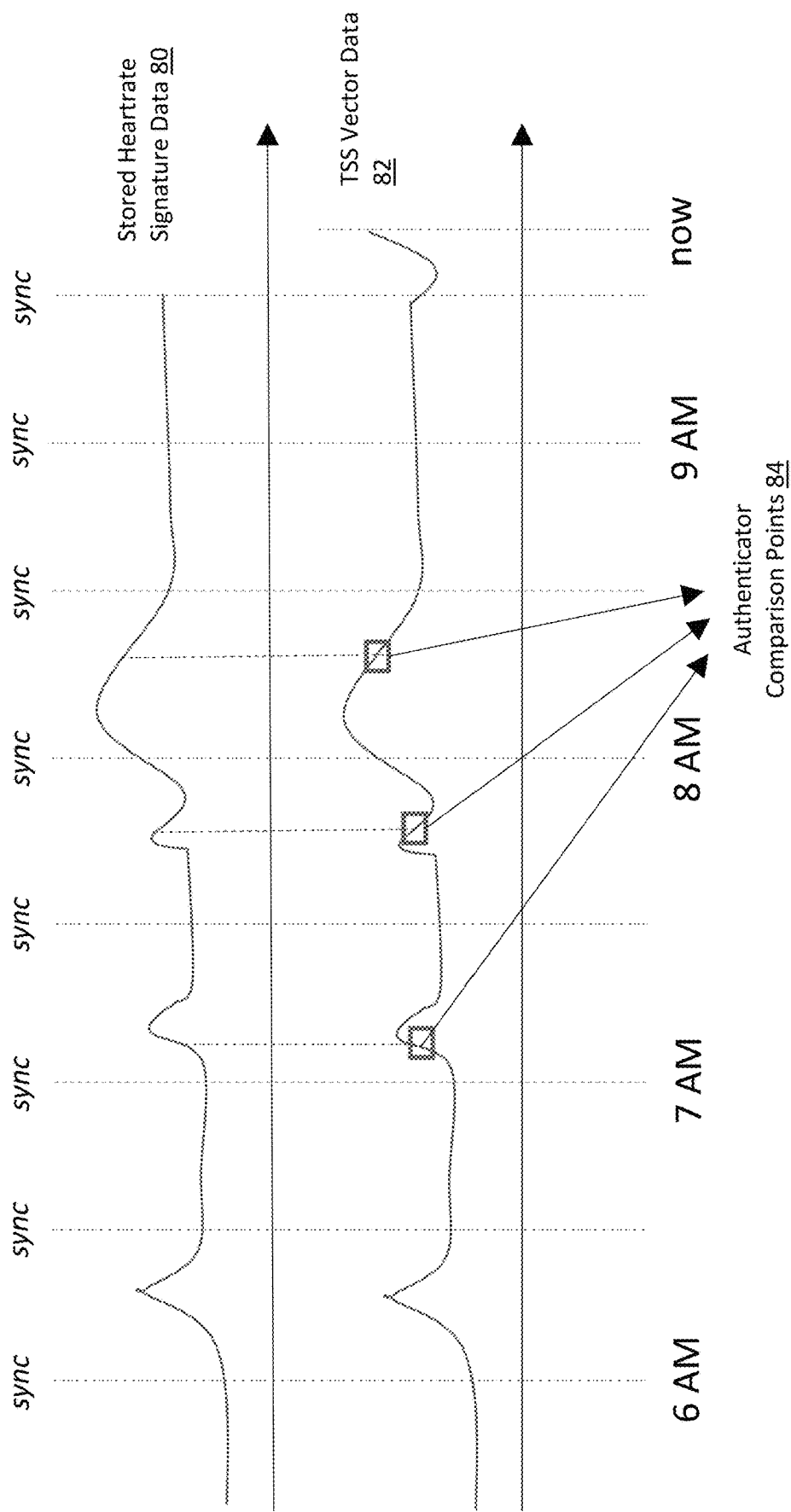
FIG. 4 shows an example of a heart rate signature according to embodiments.

FIG. 4 depicts an example of how heartrate data can be used as one or more data points for authenticating a user/device. The top of the diagram shows stored heartrate signature data 80 collected between 6:00 AM and 9:30 AM, which may for example comprise data collected on the prior day, or average values collected over several days that is stored in the signature database 26 (FIG. 1). The bottom of the diagram shows TSS vector data 82 collected (e.g., today) for the same synchronized time window and queried as part of an authentication request. Authenticator 24 (FIG. 1) may for example select several comparison points 84 along both signatures to determine if a match exists. The heartrate data may be one of many data points within the TSS vector (e.g., along with other physiological, behavioral and operational data points), or may comprise the entire TSS vector. The authenticator 24 could deliberately pick time points when the heartbeat was unusual. If the authenticator 24 evaluated just some average values, it was unlikely to get it correct. Instead, by evaluating outliers, the authenticator 24 can better prove that the current and stored versions have the same detailed history (perhaps extending to before a fraudulent device was "cloned" and started caching results in the signature database 26).

Advantages of the current approach include the fact that authentication challenges are not static in nature, but instead involve data points that change regularly over time. As such, the authentication process is more akin to a "rolling code" that is unpredictable and has high entropy. In this way, simply replacing the MAC address (or processor ID number, password, etc.) is not enough to break into the service provider's system since the intruder will unlikely be able to duplicate the constantly changing states collected on the user device. Selection of the subset of data points that make up the TSS vector can be determined in any fashion, including selecting data items with high entropy, using dynamic or random selection, etc., which further prevents an intruder from predicting or guessing a correct value. Moreover, collecting signature data from multiple coordinated user devices may be employed to further increase the efficacy of the authentication process. In addition, by collecting and combining behavioral, physiological and operational signatures over time, a great deal of signature complexity is achieved that is not easy to defeat.

It is understood that the authentication service 18 may be implemented as a computer program product stored on a computer readable storage medium. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Python, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Computing system 10 that may comprise any type of computing device and for example includes at least one processor 12, memory 20, an input/output (I/O) 14 (e.g., one or more I/O interfaces and/or devices), and a communications pathway 16. In general, processor(s) 12 execute program code which is at least partially fixed in memory 20. While executing program code, processor(s) 12 can process data, which can result in reading and/or writing transformed data from/to memory and/or I/O 14 for further processing. The pathway 16 provides a communications link between each of the components in computing system 10. I/O 14 can comprise one or more human I/O devices, which enable a user to interact with computing system 10. Computing system 10 may also be implemented in a distributed manner such that different components reside in different physical locations.

Furthermore, it is understood that the authentication service 18 or relevant components thereof (such as an API component, agents, etc.) may also be automatically or semi-automatically deployed into a computer system by sending the components to a central server or a group of central servers. The components are then downloaded into a target computer that will execute the components. The components are then either detached to a directory or loaded into a directory that executes a program that detaches the components into a directory. Another alternative is to send the components directly to a directory on a client computer hard drive. When there are proxy servers, the process will select the proxy server code, determine on which computers to place the proxy servers' code, transmit the proxy server code, then install the proxy server code on the proxy computer. The components will be transmitted to the proxy server and then it will be stored on the proxy server.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. An authentication service, comprising:
 one or more computer processors comprising:
  a data management system for periodically collecting and storing signature data from each of a set of registered devices, wherein the signature data includes a plurality of data points, wherein the plurality of data points includes a device usage characteristic;
  a system for obtaining a temporal signature state (TSS) vector of a device in response to a completion of a first authentication process for a transaction request from the device wherein the first authentication process is a password authentication process, wherein the TSS vector includes values for a selected subset of the data points forming the signature data; and
  an authenticator for comparing the TS S vector of the device with stored signature data in order to authenticate the device, wherein the authenticator analyzes the corresponding stored signature data for a given data point in the subset of data points of the TSS vector, wherein the authenticator analyzes the stored signature data for the given data point as a time based function to predict an expected value of the corresponding stored signature data for a given data point in the subset of data points of the TSS vector, wherein the authenticator compares the predict value for the given data point in the subset of data points of the TSS vector to the actual given data point in the subset of data points of the TSS vector, wherein the authenticator denies or authorizes the transaction request based on the results of the comparison.

2. The authentication service of claim 1, wherein the device usage characteristic includes information associated with at least one of: photos on the device, emails on the device, texts on the device, a screen saver used on the device, apps used on the device; games played on the device, and music on the device.

3. The authentication service of claim 1, wherein the signature data further includes a physiological measure of a device user.

4. The authentication service of claim 1, wherein the signature data further includes operational features of the device including information associated with at least one of: battery level, cellular signal strength, wifi signal strength, and device location.

5. The authentication service of claim 1, wherein the authenticator analyzes each data point in the TSS vector against stored signature data to generate a composite confidence score that is then compared to a security threshold value.

6. The authentication service of claim 1, wherein the subset of data points in the TSS vector are selected by one of the service provider or the authentication service.

7. The authentication service of claim 1, wherein the subset of data points in the TSS vector are determined using a random process or heuristic.

8. A computer program product stored on a computer readable storage medium, which when executed by a computing system, provides an authentication service, the program product comprising:
program code that periodically collects and stores signature data from each of a set of registered devices, wherein the signature data includes a plurality of data points, and wherein the plurality of data points includes a device usage characteristic;
program code for obtaining a temporal signature state (TSS) vector of a device in response to a completion of a first authentication process for a transaction request from the device wherein the first authentication process is a password authentication process, wherein the TSS vector includes values for a selected subset of the data points forming the signature data;
program code to analyzes the corresponding stored signature data for a given data point in the subset of data points of the TSS vector, wherein the stored signature data is analyzed for the given data point as a time based function to predict an expected value of the corresponding stored signature data for a given data point in the subset of data points of the TSS vector;
program code for comparing the TSS vector of the device with stored signature data in order to authenticate the device, wherein the comparing the TSS vector of the device with stored signature data comprises comparing the predict value for the given data point in the subset of data points of the TSS vector to the actual given data point in the subset of data points of the TSS vector; and
program code to denies or authorizes the transaction request based on the results of the comparison.

9. The computer program product of claim 8, wherein the device usage characteristic includes information associated with at least one of: photos on the device, emails on the device, texts on the device, a screen saver used on the device, apps used on the device; games played on the device, and music on the device.

10. The computer program product of claim 8, wherein the signature data further includes a physiological measure of a device user.

11. The computer program product of claim 8, wherein the signature data further includes operational features of the device including information associated with at least one of: battery level, cellular signal strength, wifi signal strength, and device location.

12. The computer program product of claim 8, wherein each data point in the TSS vector is analyzed against stored signature data to generate a composite confidence score that is then compared to a security threshold value.

13. The computer program product of claim 8, wherein the subset of data points in the TSS vector are selected by one of the service provider or the authentication service.

14. The computer program product of claim 8, wherein the subset of data points in the TSS vector are determined using a random process or heuristic.

15. A computerized method for providing an authentication service, comprising:
periodically collecting and storing signature data from each of a set of registered devices, wherein the signature data includes a plurality of data points, and wherein plurality of data points includes a device usage characteristic;
obtaining a temporal signature state (TSS) vector of a device in response to a completion of a first authentication process for a transaction request from the device wherein the first authentication process is a password authentication process, wherein the TSS vector includes values for a selected subset of the data points forming the signature data;
analyzing the corresponding stored signature data for a given data point in the subset of data points of the TSS vector, wherein the stored signature data is analyzed for the given data point as a time based function to predict an expected value of the corresponding stored signature data for a given data point in the subset of data points of the TSS vector;
comparing the TSS vector of the device with stored signature data in order to authenticate the device, wherein the comparing the TSS vector of the device with stored signature data comprises comparing the predict value for the given data point in the subset of data points of the TSS vector to the actual given data point in the subset of data points of the TSS vector; and
denying or authorizing the transaction request based on the results of the comparison.

16. The method of claim 15, wherein the device usage characteristic includes information associated with at least one of: photos on the device, emails on the device, texts on the device, a screen saver used on the device, apps used on the device; games played on the device, and music on the device.

17. The method of claim 15, wherein the signature data further includes a physiological measure of a device user.

18. The method of claim 15, wherein the signature data further includes operational features of the device including information associated with at least one of: battery level, cellular signal strength, wifi signal strength, and device location.

19. The method of claim 15, wherein each data point in the TSS vector is analyzed against stored signature data to generate a composite confidence score that is then compared to a security threshold value.

20. The method of claim 15, wherein the subset of data points in the TSS vector are selected by one of the service provider, the authentication service, a random process or a heuristic.

* * * * *